Figure 1:
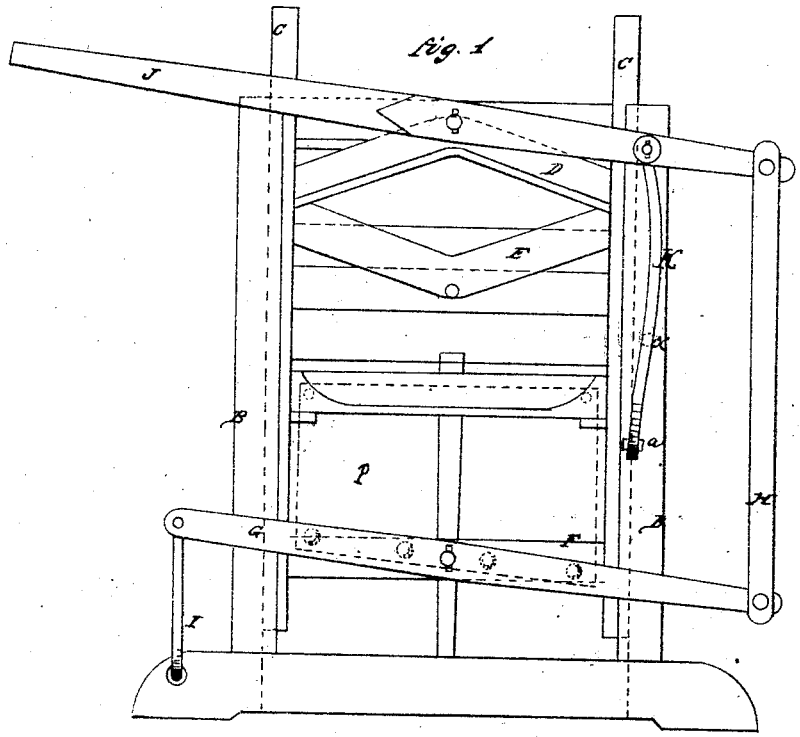
Figure 2:
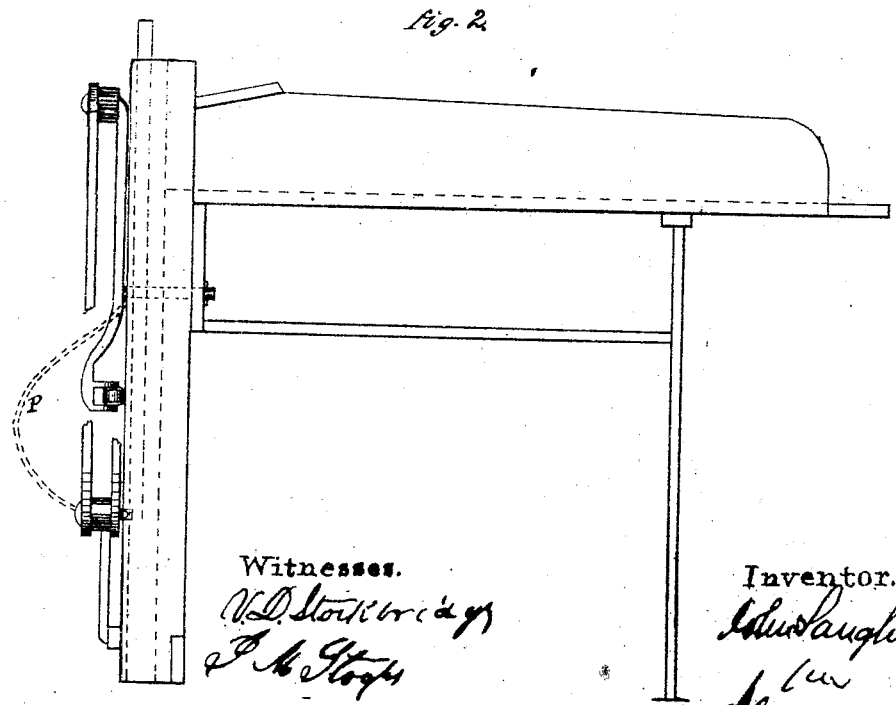

J. Laughlin.
Straw-Cutter.
N° 76209  Patented Mar. 31, 1868.

Witnesses.  Inventor.

United States Patent Office.

JOHN LAUGHLIN, OF GETTYSBURG, PENNSYLVANIA.

Letters Patent No. 76,209, dated March 31, 1868.

IMPROVEMENT IN STRAW-CUTTER.

The Schedule referred to in these Letters Patent and making part of the same.

TO ALL WHOM IT MAY CONCERN:

Be it known that I, JOHN LAUGHLIN, of Gettysburg, in the county of Adams, and in the State of Pennsylvania, have invented certain new and useful Improvements in Straw-Cutters; and do hereby declare that the following is a full, clear, and exact description thereof, reference being had to the accompanying drawings, and to the letters of reference marked thereon.

In the annexed drawings, making part of this specification, A represents the box of a straw-cutter, which may be made in any of the known and usual ways, and supported upon suitable legs. B B represent the two front legs of this box, which are provided on their inner sides, or sides which face each other, with two long vertical grooves, made of sufficient width to accommodate two gates, one by the side of the other. C and F represent the gates, which are made in a substantial manner, and fitted in the grooves in the legs B B, so that they will play by the sides of each other, and in opposite directions. These gates are each provided with knives made as follows: I take a piece of sheet steel, of sufficient length, width, and thickness, and form it, first, so that its edges will be in a V-shape, the angle being at the centre of the blade, and greater than forty-five degrees. One side of the edge, which is to be the cutting-edge, is then bevelled as straw-cutter knives usually are. When this has been done, I give the knife a very slight curve on its face, from one end to the other, forming a convex surface on one side and a concave on the other. One of these knives is secured in each of the gates, and they are so placed that their convex sides are together. The object in making and placing the knives together in this manner is, that as they pass each other in their work, their edges bind against each other from point to point, and cut the straw or hay as fast as they touch it, without forcing it toward the centre of the knives or allowing it at any time to spring them apart. These knives cut like a pair of shears or scissors, and their form keeps them well braced toward each.

The gates C and F are operated by means of the levers J and G. The lever G has one end pivoted to a vibrating-standard, I, and is pivoted near its centre to the bottom cross-rail of gate F. H represents a connecting-bar which connects one end of lever G to one end of lever J. The lever J is pivoted, near its centre, to the centre of the top rail of the gate C, and is also pivoted, as seen, to a metallic bar, K, at its upper end. The bar K has an arm which leads from it, or a bolt which passes through, a little below its centre, passed through one of the front legs B, for the purpose of confining it to the leg. To the lower end of this bar is secured a pulley, $a$, which lies against the face of the leg. This bar K is intended for keeping the lever J in position and forced towards the legs B B, and thus causing said lever to bind gate C against gate F. When these gates are kept in close proximity, the edges of the knives D and E will always bind, so as to cut with great certainty and ease any straw or hay which may be placed between them. The outer end of lever J is free, and formed into a handle, by means of which it is operated. When the lever J is raised, it raises with it the gate C, while it at the same time, through connecting-bars H, causes the lever G to descend and carry downward the gate F, thus causing the two gates to separate the knives D and E. Straw being fed between the knives while they are apart, the lever J is forced downward by the operator, carrying with it the gate C, and causing gate F, through bar H and lever G, to rise, thus bringing the edges of the knives together, so that they will pass each other with a shear-cut and sever the straw. The bar K keeps one end of lever J pressed inward, while the operator regulates and presses inward the other end to correspond. When the bar K vibrates, the roller or friction-wheel $a$ plays against the face of the leg B to prevent friction.

P represents an apron, the lower end of which is attached to the lever G, while its upper end is attached to the bottom cross-rail of the gate C. This apron answers a double purpose, of throwing off the cut hay which falls from the knives, and also of stopping the gates from separating further than a given distance. This apron may be made of such length as to stop the gates at any required point.

Having thus fully described my invention, what I claim as new, and desire to secure by Letters Patent, is—

1. The gates C F, playing in grooves in the legs B B, and provided with V-shaped knives, constructed as specified, and used in combination with the apron P, lever G, handle J, and bar K, all constructed and operating substantially as set forth.

2. The bar K, provided with a friction-roller, and used with the handle and frame of a straw-cutter for assisting in causing the edges of the knives to bind against each other or against a cutting-plate, as is herein fully set forth.

In testimony that I claim the foregoing, I have hereunto set my hand, this 14th day of February, 1868.

JOHN LAUGHLIN.

Witnesses:
C. M. ALEXANDER,
V. D. STOCKBRIDGE.